(12) United States Patent
Kanaoka

(10) Patent No.: US 7,345,799 B2
(45) Date of Patent: Mar. 18, 2008

(54) OPTICAL RECORDING MEDIUM AND ITS USE

(75) Inventor: Toshikazu Kanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 11/145,824

(22) Filed: Jun. 6, 2005

(65) Prior Publication Data

US 2006/0187510 A1 Aug. 24, 2006

(30) Foreign Application Priority Data

Feb. 23, 2005 (JP) ............................. 2005-047811

(51) Int. Cl.
*G02B 5/32* (2006.01)
(52) U.S. Cl. ............................... 359/35; 359/31; 359/3

(58) Field of Classification Search ................. 359/31, 359/35, 30
See application file for complete search history.

(56) References Cited

FOREIGN PATENT DOCUMENTS

| JP | 2004-004434 | 1/2004 |
|----|-------------|--------|
| WO | WO 02/48801 | 6/2002 |

*Primary Examiner*—Fayez G. Assaf
(74) *Attorney, Agent, or Firm*—Greer, Burns & Crain, Ltd.

(57) ABSTRACT

An optical recording medium which comprises a holographic recording layer on which information is recorded by means of holography, a light shield member fixed to at least one of main surfaces of the holographic recording layer, a control electrode for controlling a light transmission state of the light shield member, wherein, the light shield member has a plurality of pixels obtained by dividing the light shield member on a recording unit region basis, and the light transmission state can be controlled pixel by pixel.

15 Claims, 13 Drawing Sheets

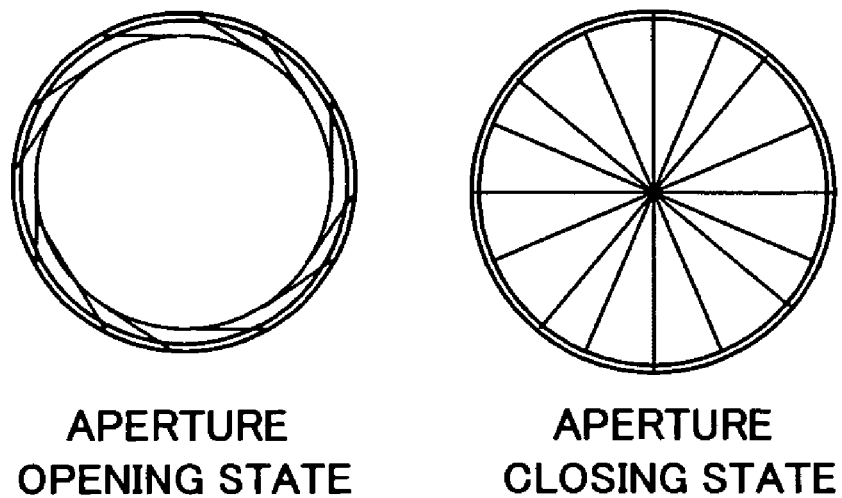

OPTICAL RECORDING MEDIUM AND ITS USE

CROSS-REFERENCE TO RELATED APPLICATION

This application is related to Japanese application No.2005-47811 filed on Feb. 23, 2005 whose priority is claimed under 35 USC §119, the disclosure of which is incorporated by reference in its entirety.

BACKGROUND OF THE INVENTION

1. Field of the Invention

The present invention-relates to an optical recording medium for recording digital data three-dimensionally thereon by a principle of holography, a method for recording information onto the optical recording medium, a method for reproducing the information on the optical recording medium, and an information recording/reproducing device.

2. Description of Related Art

In holographic storage, two-dimensional digital data is multiplex-recorded by using two light beams of a reference beam and an object beam, thereby performing three-dimensional recording. As multiplex-recording methods, there are known angle multiplexing, wavelength multiplexing, phase code multiplexing and the like.

As a conventional method for recording data at high packing density on a recording medium, a method disclosed in JP-A 2004-4434 is known.

The publication discloses a method for recording information only in one of a plurality of regions obtained by dividing a recording layer by selectively irradiating the region with an object beam and a reference beam. In this method, different information can be recorded in different regions, so that a recording capacity per medium can be increased.

By disposing, above a recording medium, a spatial beam selector having an opening only in a portion corresponding to a region from which information is desired to be reproduced, and irradiating the recording layer with a reference beam in such a state, information recorded by the method above can be reproduced only from the desired region.

In the above-mentioned method, the spatial beam selector is not used at the time of recording information, but is disposed above a medium at the time of reproduction. Consequently, it is difficult to achieve accurate alignment between the medium and the spatial beam selector. In the case where accurate alignment between the medium and the spatial beam selector cannot be obtained, there may arise various problems such that information in a neighboring region is reproduced.

In addition, there arise the following two problems.

First, a photopolymer and photorefractive material as candidates of recording material of a holographic memory are photosensitive materials and are easily exposed to natural light like a film of a camera, so that erroneous recording, data destruction and the like will occur. Consequently, when it is assumed to use the material for a removable medium, equipment for preventing exposure is essential.

Second, from an aspect of a storage system, address information indicative of a recording/reproducing position on a medium is necessary. In the case where address information using pits and wobbles as used in a conventional optical disc medium is recorded on the same recording surface, although two-dimensional information of several tens of thousands of bits is recorded with condensed light in holographic recording, only 1-bit information can be read from a pit or wobble with the same condensed light. Consequently, the proportion of an area of a region for recording address information becomes relatively large and a substantial recording region decreases.

SUMMARY OF THE INVENTION

The present invention has been achieved in consideration of the circumstances and provides an optical recording medium in which data can be accurately recorded/reproduced to/from a specific region.

The present invention provides an optical recording medium which comprises a holographic recording layer on which information is recorded by means of holography, a light shield member fixed to at least one of main surfaces of the holographic recording layer, a control electrode for controlling a light transmission state of the light shield member. Herein, the light shield member has a plurality of pixels obtained by dividing the light shield member on a recording unit region basis, and the light transmission state can be controlled pixel by pixel.

The optical recording medium of the present invention has a light shield member whose light transmission state can be controlled pixel by pixel. Consequently, information can be recorded to/reproduced from only a pixel which is made light-transmittable, so that cross write and cross read can be prevented.

The light shield member is fixed onto the holographic recording layer. Consequently, the position of the pixel which is made light-transmittable can be specified with high precision, and the position of recording/reproduction can be specified with high precision. Without providing an address information region, information can be recorded/reproduced at a proper position, so that decrease in a substantial recording area can be suppressed.

Since the light shield member is attached to at least one of main surfaces, by properly shielding the other surface from light, exposure of the holographic recording layer can be effectively prevented.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 7 shows an example of a pixel in an MEMS panel, according to the first embodiment of the present invention;

FIG. 8 shows an example of a phase code modulation pattern, according to the first embodiment of the present invention;

DESCRIPTION OF THE PREFERRED EMBODIMENTS

Figure 1A:
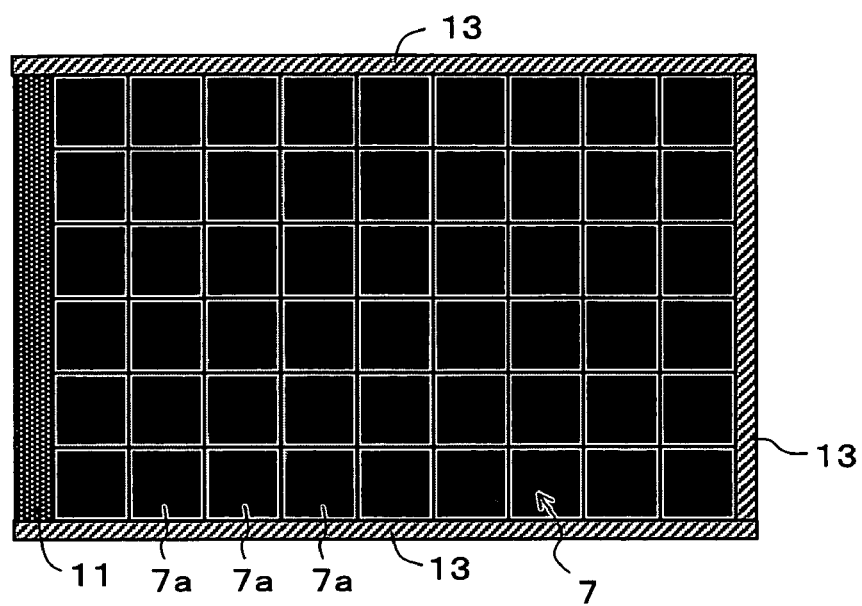
FIGS. 1A and 1B are a plan view and a cross-sectional view, respectively, of an optical recording medium according to a first embodiment of the present invention.

The present invention provides an optical recording medium which comprises a holographic recording layer on which information is recorded by means of holography, a light shield member fixed to at least one of main surfaces of the holographic recording layer, a control electrode for controlling a light transmission state of the light shield member. Herein, the light shield member has a plurality of pixels obtained by dividing the light shield member on a recording unit region basis, and the light transmission state can be controlled pixel by pixel.

Here, respective constituent elements of the invention will be described.

The light shield member fixed to the main surface of the holographic recording layer may be a structure (made of a material) which does not transmit light to the holographic recording layer provided below. Specifically, a liquid crystal panel or an MEMS (Micro Electro-Mechanical System) panel can be used as the light shield member.

From an aspect of preventing exposure of the holographic recording layer, when a control electrode is not supplied with electricity, preferably, the light shield member does not transmit light.

Further, from an aspect of performing accurate recording/reproduction, preferably, the light shield layer is securely fixed to the main surface of the holographic recording layer by using an adhesive. A coupling mechanism having a projected part and a recessed part which are fit to each other maybe provided so that the light shield member and the holographic recording layer are fixedly held.

The recording medium of the present invention may be a medium obtained by forming a reflection layer and the holographic recording layer in this order on a substrate and fixedly providing a light shield member on the holographic recording layer.

From an aspect of preventing cross write and the like, a pixel has preferably a shape close to a spot shape of a transmission beam. More preferably, pixels each having a substantially regular hexagonal shape are arranged so as to be closely packed.

Further, when the light shield member is an MEMS panel, preferably, the light transmission state is controlled by opening/closing an aperture.

The control electrode is provided to supply a control voltage to the light shield member and may be provided in a region different from the light irradiation face, such as a side face of the holographic recording layer.

A shutter may be provided on the other main surface of the holographic recording layer, and another light shield member may be fixedly mounted.

From an aspect of preventing exposure, it is preferable to provide a light shield film on a side face of the holographic recording layer.

The present invention also provides a method for recording information on an optical recording medium which comprises a holographic recording layer on which information is recorded by means of holography, a light shield member fixed to at least one of main surfaces of the holographic recording layer, and a control electrode for controlling a light transmission state of the light shield member, in which the light shield member has a plurality of pixels obtained by dividing the light shield member on a recording unit region basis, and the light transmission state can be controlled pixel by pixel. Herein, the method comprises the steps of applying a predetermined voltage to the control electrode to make at least one of the pixels of the light shield member light-transmittable, irradiating the holographic recording layer with an object beam via the light-transmittable pixel in this state, and simultaneously irradiating the position irradiated with the object beam with a reference beam to record information on a region corresponding to the pixel.

The present invention also provides a method for reproducing information from an optical recording medium which comprises a holographic recording layer on which information is recorded by means of holography, a light shield member fixed to at least one of main surfaces of the holographic recording layer, and a control electrode for controlling a light transmission state of the light shield member, in which the light shield member has a plurality of pixels obtained by dividing the light shield member on a recording unit region basis, and the light transmission state can be controlled pixel by pixel. Herein, the method comprises the steps of applying a predetermined voltage to the control electrode to make at least one of the pixels of the light shield member light-transmittable, irradiating the holographic recording layer with a reference beam in this state, and detecting the reference beam via the light-transmittable pixel to reproduce information recorded on the region corresponding to the pixel.

The present invention also provides a device for recording/reproducing information to/from an optical recording medium which comprises a holographic recording layer on which information is recorded by means of holography, a light shield member fixed to at least one of main surfaces of the holographic recording layer, and a control electrode for controlling a light transmission state of the light shield member, in which the light shield member has a plurality of pixels obtained by dividing the light shield member on a recording unit region basis, and the light transmission state can be controlled pixel by pixel. Herein, the device comprises a mounting part on which the optical recording medium is mounted, a connection part to be electrically connected to the control electrode, a controller for electrically controlling a light shield member via the connection part, and a light emitter for emitting an object beam and a reference beam to the holographic recording layer. In this device, preferably, in the case of recording information A on the holographic recording layer, the controller sets the portion in a light shield member corresponding to the position of a pixel in which the information A is to be recorded into a light transmittable state.

Hereinafter, embodiments of the present invention will be described with reference to the drawings.

1. First Embodiment

Figure 1B:
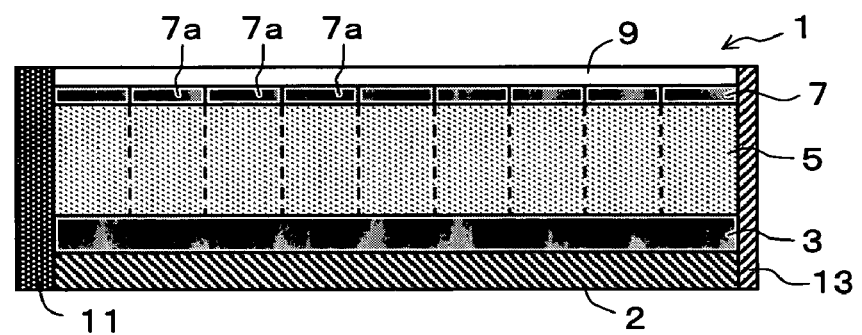

FIGS. 1A and 1B are a plan view and a cross-sectional view, respectively, showing a structure of an optical recording medium according to a first embodiment. A medium 1 according to this embodiment shown in FIG. 1A and 1B has a structure that a reflection layer 3, a holographic recording layer 5, a light shield member 7, and a protection layer 9 are formed in this order on a substrate 2. As the light shield member 7, a liquid crystal panel having a region divided into a plurality of pixels 7a is used. The liquid crystal panel 7 is fixed by an adhesive or the like and is protected with the protection layer 9. On one of side faces of this medium, a control electrode 11 for electrically controlling a light transmission state (either a light transmittable state or a light non-transmittable state) of the liquid crystal panel 7 is provided. The control electrode 11 is electrically connected to a controller in an optical recording/reproducing device which will be described later, and the controller controls the liquid crystal panel 7 pixel by pixel. The other side face of this medium is covered with a light shield film 13 for preventing the holographic recording layer 5 from being exposed to light. As the light shield film 13, for example, a film containing a light shield material such as carbon particles or an ABS resin film can be used.

The holographic recording layer 5 is made of a holographic recording material such as a photopolymer or photorefractive material.

The liquid crystal panel 7 is of a normally black type (non-transmittable when it is not supplied with electricity). When the liquid crystal panel 7 is detached from the device (when no electricity is applied), all of the pixels 7a do not transmit light. In this state, light from the outside is interrupted, so that the holographic recording layer 5 is not exposed to light.

Figure 2A:
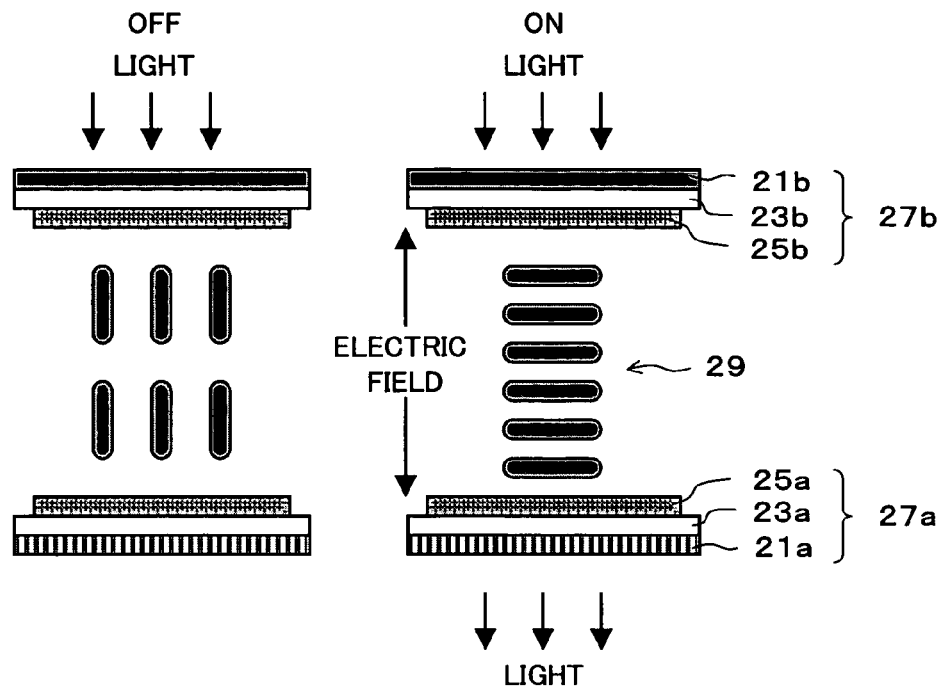
FIGS. 2A and 2B are cross-sectional views each showing a concrete configuration of a liquid crystal panel of FIGS. 1A and 1B.
Figure 2B:
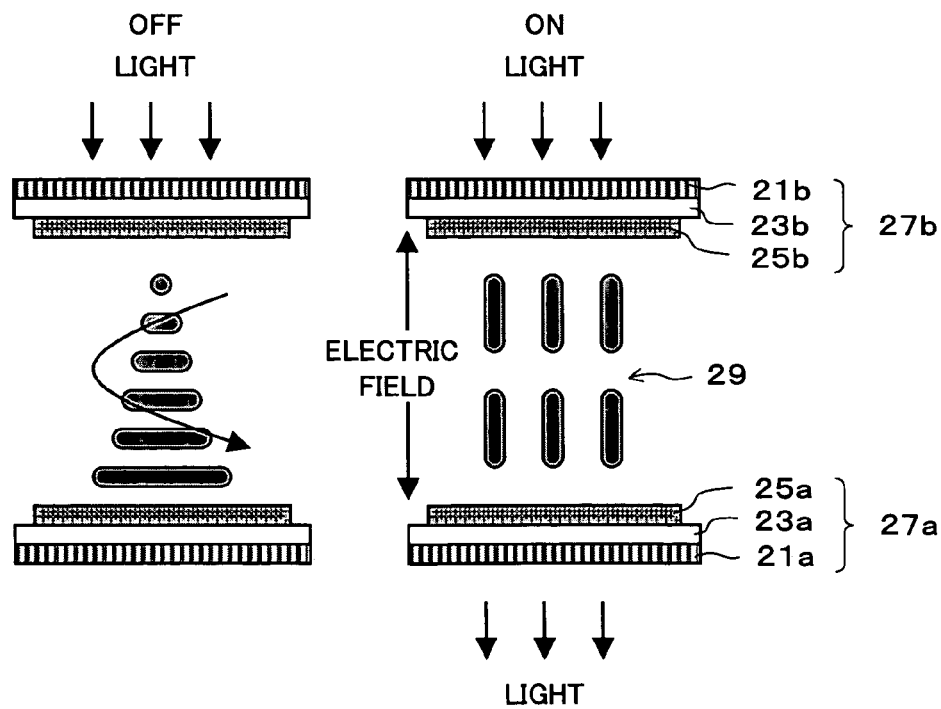

FIGS. 2A and 2B are cross-sectional views showing examples of the liquid crystal panel of the normally black type. FIG. 2A shows a liquid crystal panel of a VA (Vertically Aligned) type, and FIG. 2B shows a liquid crystal panel of a TN (Twisted Nematic) type. In both of the types, the basic configuration is the same. Liquid crystal molecules 29 are sealed between a lower panel 27a which includes a polarizer 21a, a transmission layer 23a, and an electrode-and-orientation film 25a and an upper panel 27b which includes a polarizer 21b, a transmission layer 23b, and an electrode-and-orientation film 25b.

In the VA type, the polarizer 21a and the polarizer 21b are arranged orthogonal to each other. In this arrangement, when no electric field is applied, the liquid crystal molecules are arranged in a vertical direction, so that a polarization direction of incident light is not changed by the liquid crystal and no light is transmitted. On the other hand, when an electric field is applied, the liquid crystal molecules are arranged in a horizontal direction, so that the polarization direction of incident light is changed by the liquid crystal and light is transmitted. With the above-mentioned configuration, a liquid crystal panel of the normally black type is obtained.

In the TN type, the polarizer 21a and the polarizer 21b are arranged in the same direction. In this arrangement, when no electric field is applied, the liquid crystal molecules are twisted, so that the polarization direction of incident light is changed by the liquid crystal and no light is transmitted. On the other hand, when an electric field is applied, the liquid crystal molecules are arranged in the vertical direction, the polarization direction of incident light is not changed by the liquid crystal and light is transmitted. Also with this configuration, the liquid crystal panel of the normally black type is obtained.

Figure 3A:
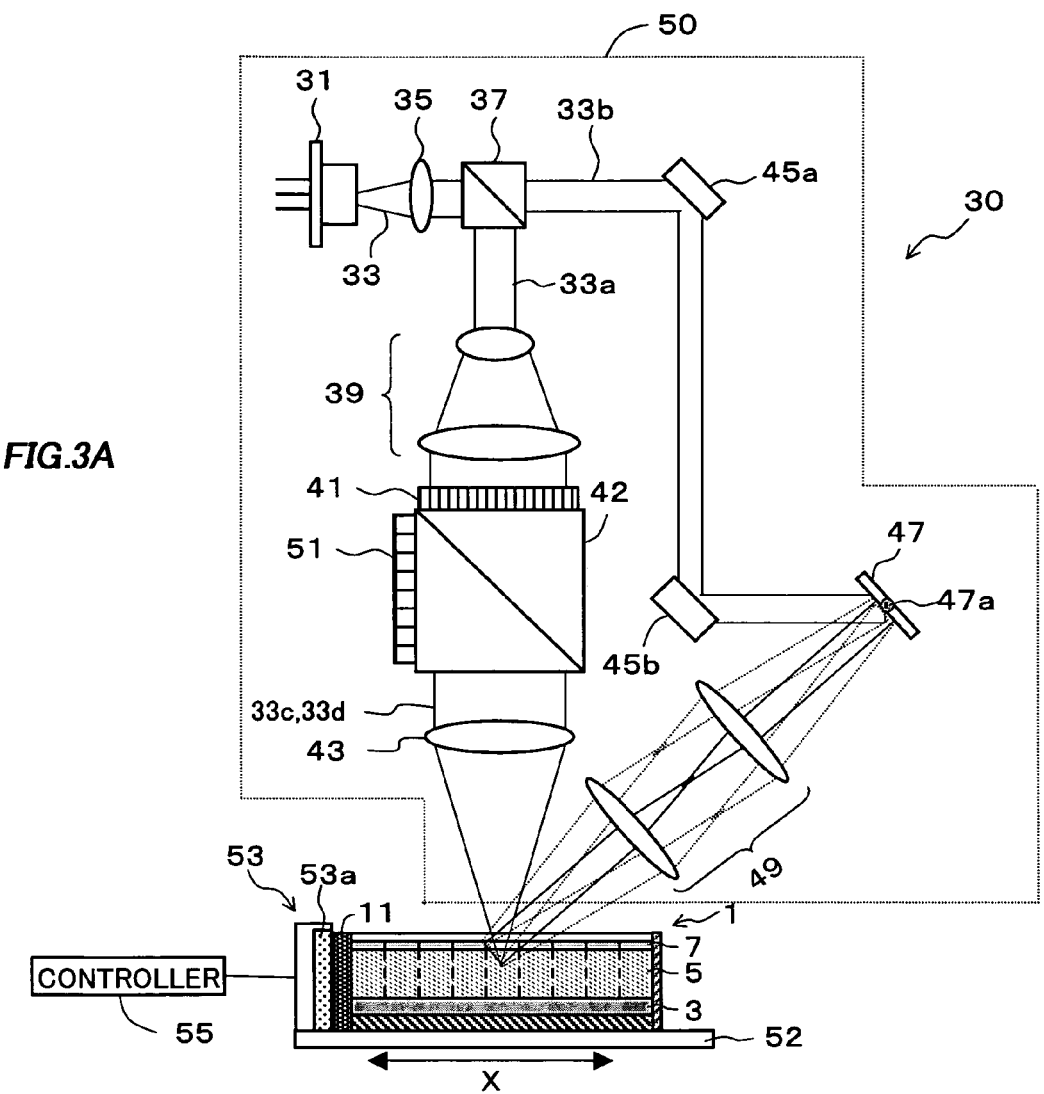
FIGS. 3A and 3B are configuration diagrams of a recording/reproducing device for the optical recording medium according to the first embodiment of the present invention.
Figure 3B:
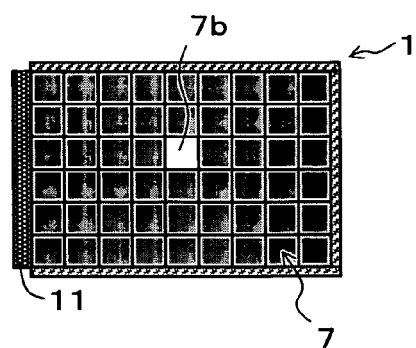

A method for recording/reproducing information to/from the medium will now be described with reference to FIGS. 3A and 3B. FIG. 3A is a configuration diagram of a recording/reproducing device 30 according to this embodiment, and FIG. 3B is a plan view of the medium 1.

A laser beam 33 emitted from a light source 31 is converted to parallel light by a collimator lens 35, and the parallel light is split into two beams 33a and 33b by a beam splitter 37. A diameter of the beam 33a as one of the beams is increased by a beam expander 39 and the resultant beam is converted to an object beam 33c having predetermined information by a spatial light modulator 41. The object beam 33c passes through a beam splitter 42, is condensed by an objective lens 43, and falls on the holographic recording layer 5 in the medium 1 via a pixel 7b in the liquid crystal panel 7 which are controlled to be light-transmittable by a controller 55 which will be described later. The other beam 33b is led by mirrors 45a and 45b to a galvanometer mirror 47, is reflected by the galvanometer mirror 47, and falls in the same position as the object beam 33c as a reference beam by a pair of lenses 49. The galvanometer mirror 47 turns around an axis 47a perpendicular to the drawing face as a center, and changes a reflection angle of the beam 33b. Even in the case where the reflection angle of the beam 33b changes, by action of the pair of lenses 49, the beam 33b falls on almost the same position as a reference beam having a different incident angle. When the incident angle of the reference beam 33b is different, different interference fringe patterns are recorded on the medium 1. By changing the angle of the galvanometer mirror, angle multiplex recording is realized.

At the time of reproduction, the beam 33a is interrupted by the spatial light modulator 41 (alternatively, the beam 33a is interrupted by a shutter or the like which is provided separately) to irradiate the medium 1 only with the reference beam 33b. When an interference fringe pattern of the holographic recording layer 5 is irradiated with the beam reflected by the reflection layer 3 of the medium 1, the beam is diffracted by the interference fringe pattern, thereby generating a reproduction beam 33d. The reproduction beam 33d travels from the medium 1 toward the objective lens 43, is reflected by the beam splitter 42, and is detected by a photodetector 51 such as a CCD, so that information is reproduced.

The medium 1 is mounted on a mounting part 52, and the control electrode 11 is electrically connected to the controller 55 via a connection part 53 having a connection electrode 53a. As shown in FIG. 3B, the controller 55 makes the pixel 7b to be recorded light-transmittable. In this state, the holographic recording layer 5 is irradiated with the object beam 33c and the reference beam 33b via the light-transmittable pixel 7b. In this case, information can be recorded only in the region corresponding to the pixel 7b, and cross write (exposure of the holographic recording layer 5 immediately below the neighboring pixels to light) can be prevented. With respect to reproduction of information, by detecting the reproduction beam 33d via the light-transmittable pixel 7b, only the information recorded in the region corresponding to the pixel 7b can be reproduced. Therefore, cross read (reproduction of information recorded in the holographic recording layer 5 immediately below the neighboring pixels) can be prevented. In this embodiment, the liquid crystal panel 7 is fixed to the holographic recording layer 5, so that the position where recording/reproduction is performed can be accurately specified by controlling a pixel in the liquid crystal panel 7.

The position of a light emitter 50 surrounded by a dotted line is fixed and the mounting part 52 is driven by a driver (not shown) so as to be movable in X and Y directions (the X direction is a direction shown by an arrow in the diagram, and the Y direction is a direction perpendicular to the drawing face). Consequently, for example, at the time of sequentially recording or reproducing information to/from pixels arranged in the X direction in the liquid crystal panel 7, operation of moving the mounting part 52 to the right by the amount of one pixel to thereby move a light-transmittable pixel to the left by the amount of one pixel, and recording or reproducing information in this state is repeated.

Figure 4:
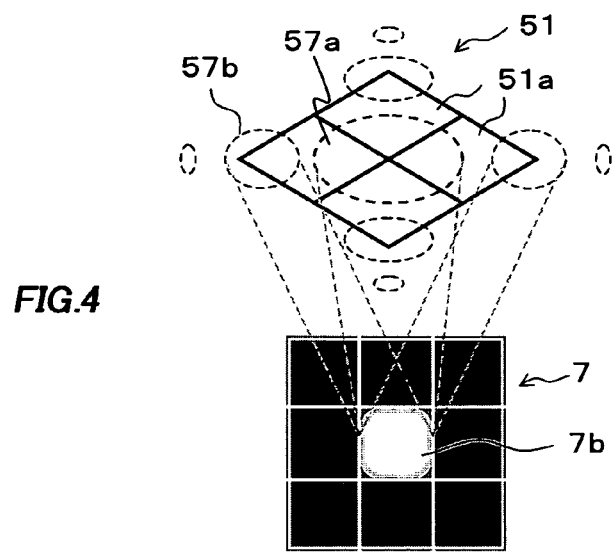
FIG. 4 illustrates a principle of making positional correction between the medium and the device, according to the first embodiment of the present invention.

In order to perform accurate alignment between the medium 1 and the recording/reproducing device 30, each time the mounting part 52 is moved, the position of the mounting part 52 is corrected before information is recorded/reproduced. The position correction will be described with reference to FIG. 4. FIG. 4 is a schematic diagram showing only part of the liquid crystal panel 7 and a portion of the photodetector 51 in FIG. 3A. In the liquid crystal panel 7, the pixel 7b is light-transmittable. The photodetector 51 is divided in four small regions 51a. When the holographic recording layer 5 is irradiated with the reference beam 33b, the reproduction beam 33d is emitted from the pixel 7b and, then, enters the photodetector 51. When alignment between the medium 1 and the recording/reproducing device 30 is not accurate, the amounts of beams entering the four small regions 51a are different from each other. In this case, the position of the mounting part 52 is adjusted so that the amounts of beams entering the four small regions become equal to each other. The reproduction beam 33d is diffracted by an edge of the pixel 7b and detected as a plurality of diffracted beams 57a and 57b.

Although a specific embodiment has been described above, the present invention is not limited to the embodiment but can be variously modified.

Figure 5:
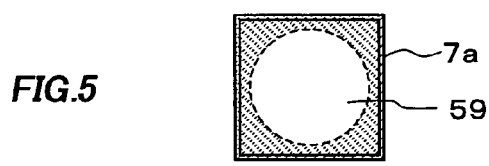
FIG. 5 is a diagram for comparing a shape of one pixel with a shape of a beam spot, according to the first embodiment of the present invention.
Figure 6A:
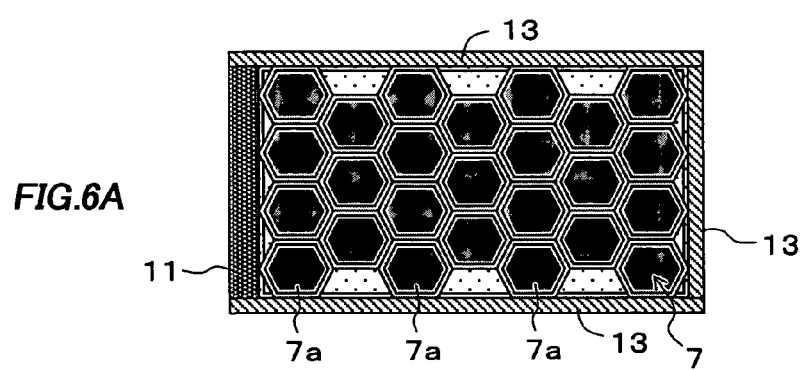
FIGS. 6A and 6B show another shape of the pixel, according to the first embodiment of the present invention.
Figure 6B:
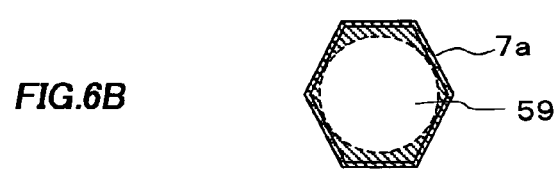

In FIGS. 1A and 1B, the pixel 7a has a square shape. However, as shown in FIG. 5, the shape of a beam spot 59 of the object beam 33c is usually a circle, so that the hatched region is not used. Consequently, as shown in FIG. 6A, preferably, the pixel 7a has a substantially regular hexagonal shape and the pixels are arranged so as to be closely packed. It is understood from FIG. 6B that the unused hatched region is reduced in this case. The "substantially regular hexagonal shape" includes not only a perfect regular hexagon but also a shape obtained by deforming a hexagon so as to be long in the longitudinal or horizontal direction. The shape may be a pentagon or a shape including six or more sides (for example, octagon).

As the light shield member 7, any member such as an MEMS panel may be used as long as it can control a light transmission state pixel by pixel. FIG. 7 shows an example of a pixel in an MEMS panel. In this case, the light transmission state is controlled by opening/closing an aperture.

The multiplexing is not limited to angle multiplexing but maybe wavelength multiplexing, phase code multiplexing or the like. In the case of performing the wavelength multiplexing, a plurality of light sources for emitting laser beams of different wavelengths are prepared, and the light sources of object beams are fixed. By sequentially varying wavelengths of reference beams, multiplexing is performed. In the case of performing the phase code multiplexing, a reference beam is modulated in advance by using a phase modulator, and a plurality of kinds of modulation patterns are generated and sequentially changed, thereby performing multiplexing. FIG. 8 shows an example of the modulation pattern. In this case, by using four kinds of modulation patterns, four-way multiplexing can be performed.

Although alignment between the medium 1 and the recording/reproducing device 30 is performed by moving the mounting part 52 in the above-mentioned embodiment, the mounting part 52 may be fixed (in other words, the medium 1 is not moved) and the whole light emitter 50 surrounded by the dotted line may be moved. The light emitter can be moved by using a motor or the like. Alternatively, only a part of the light emitter 50 may be moved by an appropriate combination of a mirror, a beam splitter and the like.

The control electrode 11 may be formed on the main surface of the medium 1 (for example, an end portion of the main surface). In place of providing the light shield film 13, the whole medium 1 may be shielded by being housed in a cartridge or the like. In this case, a shutter or the like may be provided on a light incident surface. The shutter may have any structure which can be mechanically opened/closed.

2. Second Embodiment

Figure 9A:
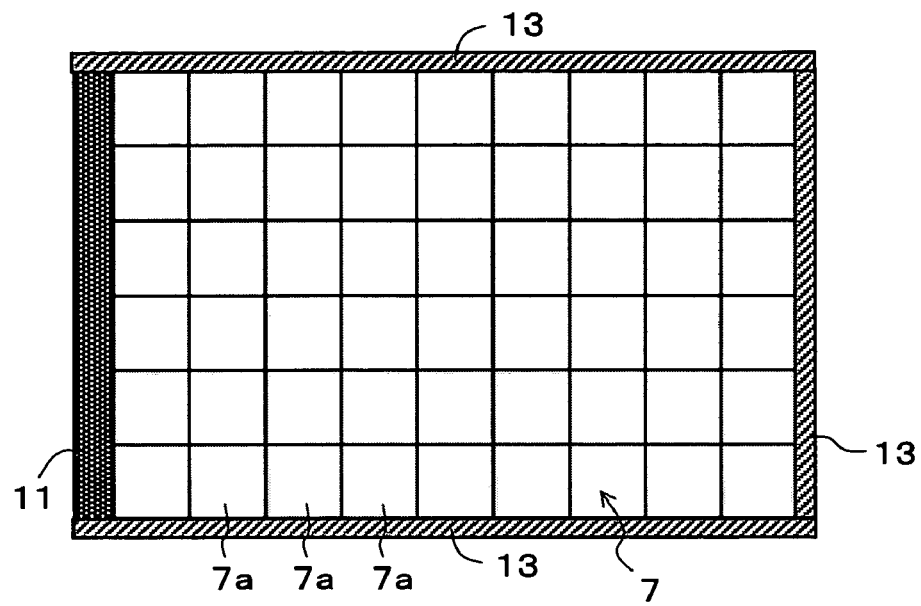
FIGS. 9A, 9B and 9C are a plan view, a cross-sectional view and a rear view, respectively, of an optical recording medium according to a second embodiment of the present invention.
Figure 9B:
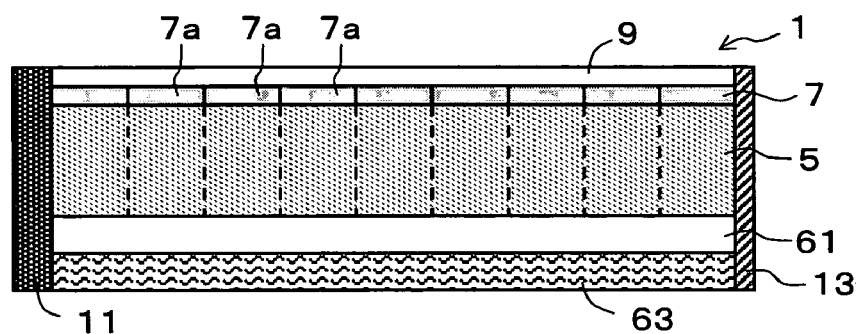
Figure 9C:
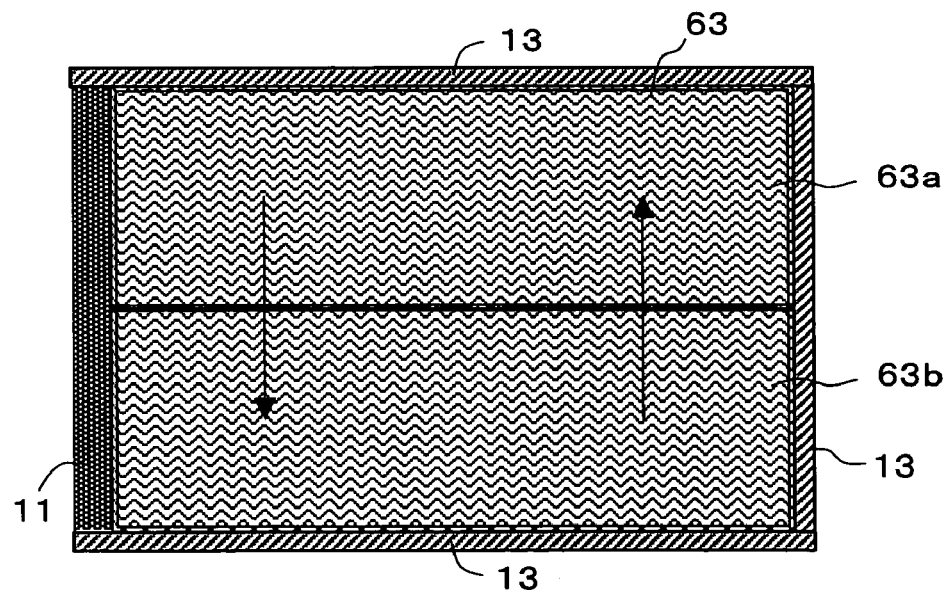

FIGS. 9A to 9C are a plan view, a cross-sectional view and a rear view, respectively, showing a structure of an optical recording medium according to a second embodiment. The medium 1 has a structure that the holographic recording layer 5 is formed on a transparent substrate 61 and the liquid crystal panel 7 having the plurality of pixels 7a as a light shield member on the holographic recording layer 5 is fixed by an adhesive or the like. A shutter 63 having light shielding property is provided on the rear surface of a substrate 61. The shutter 63 is divided in a first member 63a and a second member 63b which can be moved in a directions indicated by arrows shown in FIG. 9C. At the time of opening a region of the first member 63a, the first member 63a is moved downward and overlaid on the second member 63b. On the other hand, at the time of opening a region of the second member 63b, the second member 63b is moved upward and overlaid on the first member 63a. The other configuration is similar to that of the first embodiment.

Figure 10:
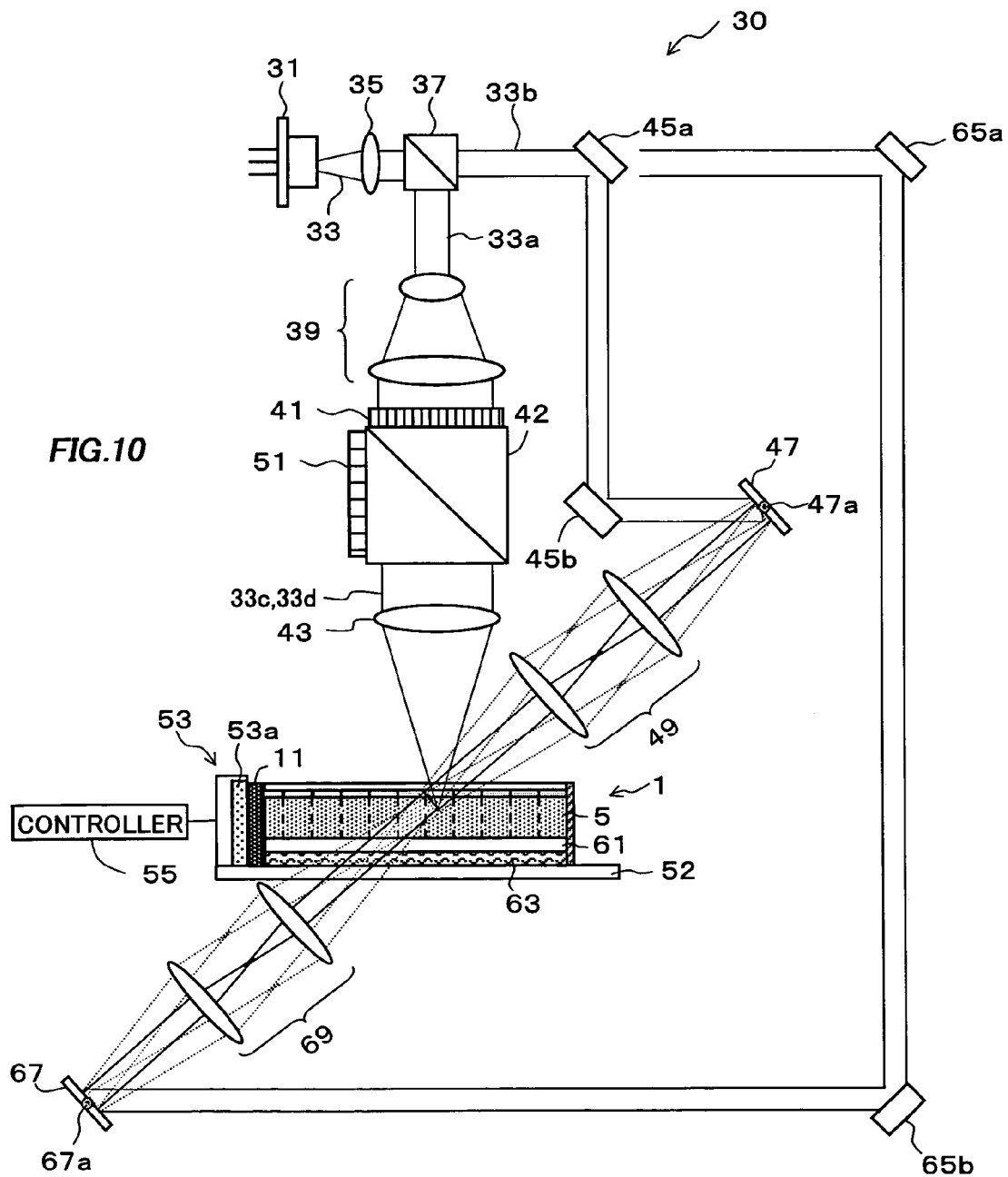
FIG. 10 is a configuration diagram of a recording/reproducing device for the optical recording medium according to the second embodiment of the present invention.

A method for recording/reproducing the medium will now be described with reference to FIG. 10. FIG. 10 is a configuration diagram of the recording/reproducing device 30 according to this embodiment.

In this embodiment, information is recorded to/reproduced from a medium of a transmission type. Information is recorded in a manner similar to the case of the medium of the reflection type (first embodiment). At the time of reproducing information, the medium of the transmission type has to be irradiated with the reference beam from below. Consequently, in this embodiment, the device 30 further includes mirrors 65a and 65b, a galvanometer mirror 67, and a pair of lenses 69. At the time of recording, the beam 33b is reflected by the mirror 45a and falls on the medium 1 via the same optical path as that in the first embodiment. At the time of reproduction, the mirror 45a is moved out of the optical path. Consequently, the beam 33b is not reflected by the mirror 45a but travels straight as it is, is reflected by the mirrors 65a and 65b and further by the galvanometer mirror 67, passes through the pair of lenses 69, and falls on the medium 1. After that, the reproduction beam 33d are generated, passes through the objective lens 43, is reflected by the beam splitter 42, and is detected by the photodetector 51.

The medium 1 is mounted on the mounting part 52. In order to irradiate the medium 1 with a beam from below, the mounting part 52 has light transmitting property or an opening. The device 30 has a mechanism which opens/closes the shutter 63. The other configuration is similar to that of the first embodiment.

The shutter 63 is not limited to the one shown in FIG. 9C but may have any structure which can be mechanically opened/closed. The shutter 63 may be divided in three or more parts. The shutter 63 may be a foldable one like an accordion or may have a structure like an aperture shown in FIG. 7.

Figure 11A:
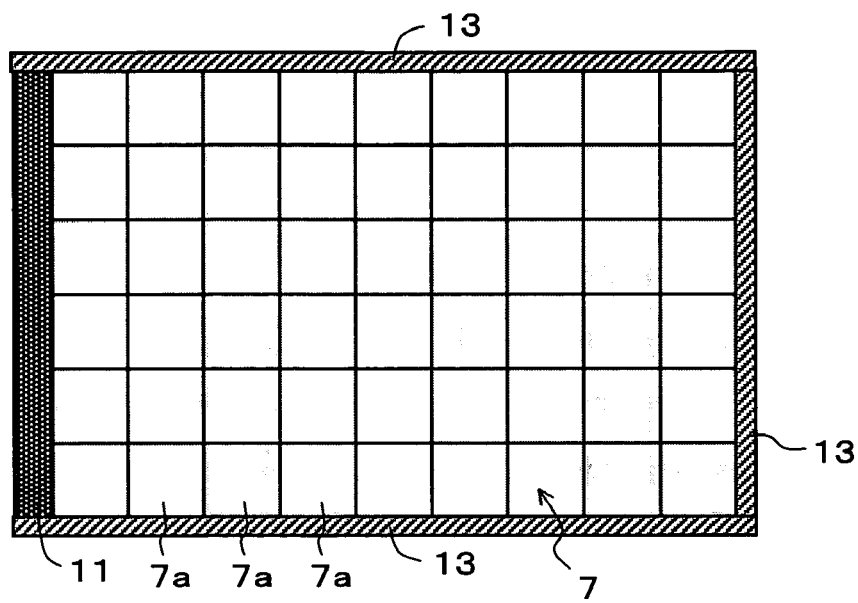
FIGS. 11A, 11B and 11C are a plan view, a cross-sectional view and a rear view, respectively, of an optical recording medium according to another embodiment of the present invention.
Figure 11B:
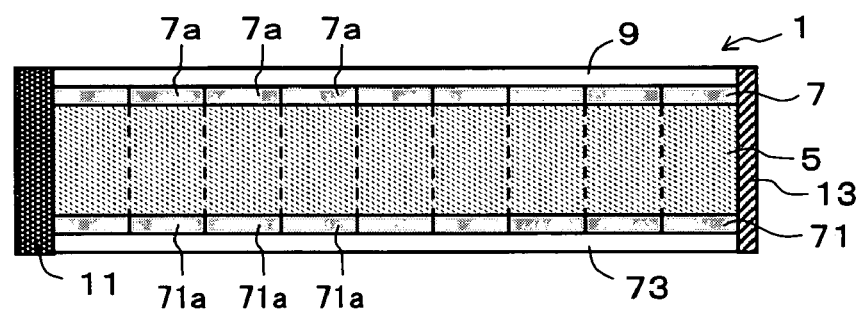
Figure 11C:
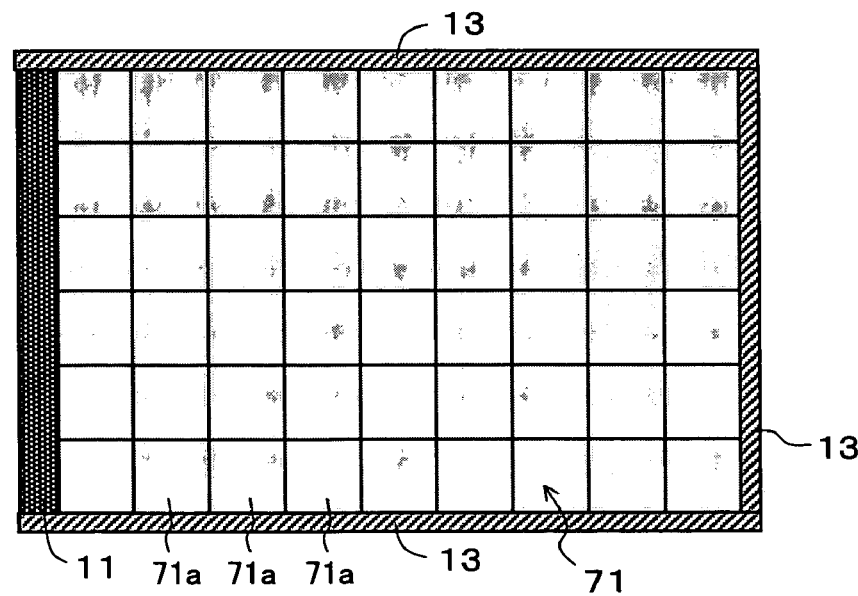

In another embodiment, in place of the shutter 63, as shown in FIGS. 11A to 11C, a light shield member (such as a liquid crystal panel or an MEMS) 71 which can be controlled pixel by pixel may be provided. Specifically, in this case, the light shield members are provided on both faces of the holographic recording layer 5. The method for recording the medium is the same as that in the case of the medium having the shutter. The reproducing method is basically the same except that at the time of emitting the reference beam, a light shield member 71 is controlled to set a pixel to be reproduced in a light transmittable state.

Figure 12A:
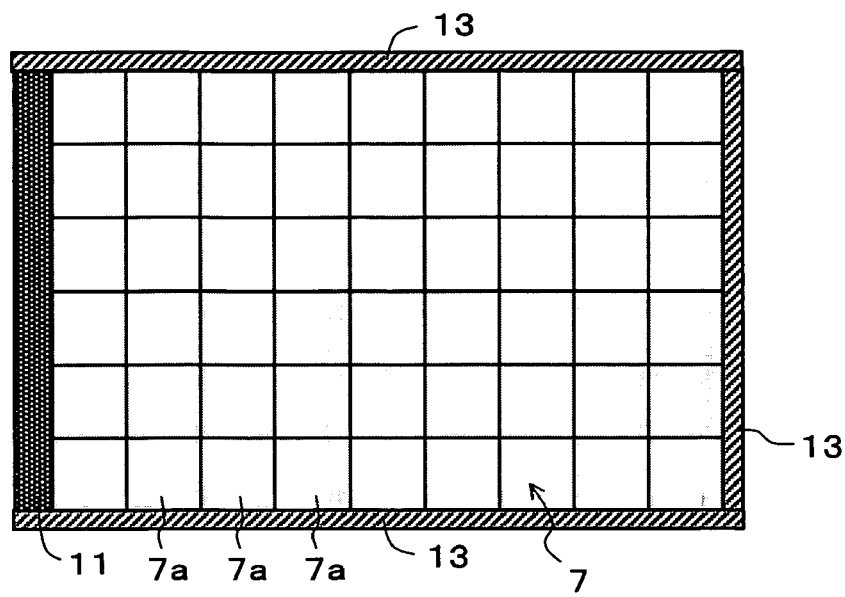
FIGS. 12A, 12B and 12C are a plan view, a cross-sectional view and a rear view, respectively, of an optical recording medium according to still another embodiment of the present invention.
Figure 12B:
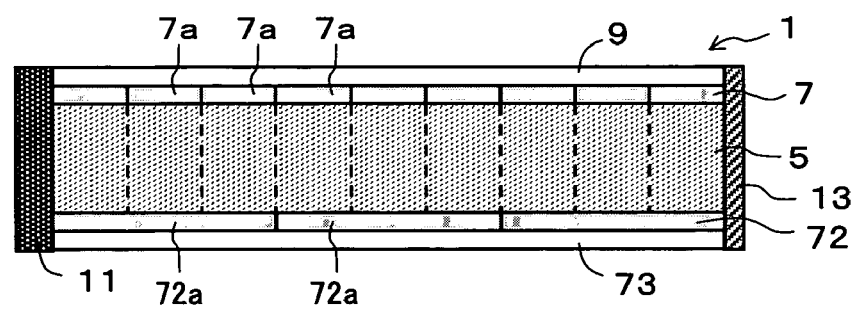
Figure 12C:
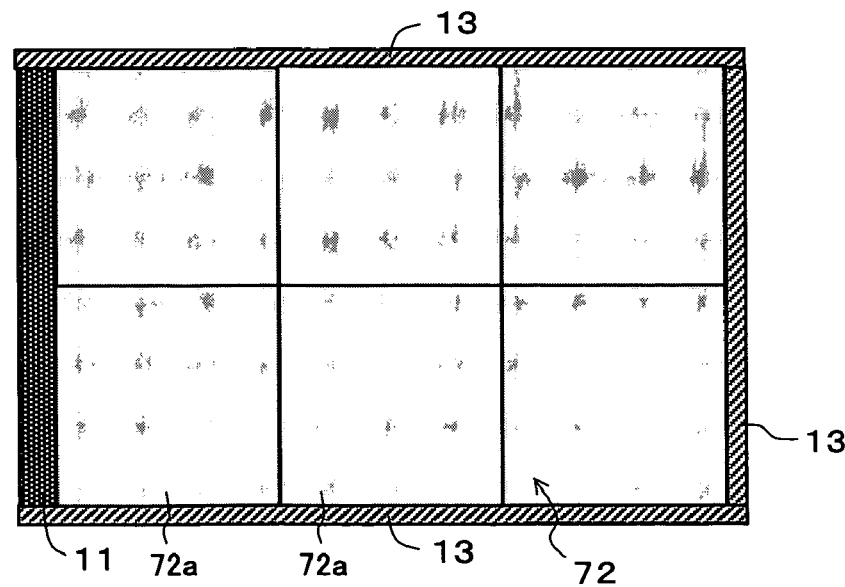

The number of pixels and the size of the light shield member on one of the surfaces of the holographic recording layer 5 and those of the light shield member on the other surface may be different from each other. As shown in FIGS. 12A to 12C, it is preferable to set the size of a pixel 72a in the light shield member 72 on the rear face to be larger than that of the pixel 7a of the light shield member 7 on the front face. Since the whole of the rear face may be irradiated with the reference beam, even if the pixel size of the light shield member 72 is increased, the precision of the recording/reproduction position does not deteriorate. In this case, the number of electrodes for controlling the light shield member 72 can be decreased and the manufacturing cost can be reduced. In the configuration of FIG. 12, it is unnecessary to accurately align the light shield members on the front face and rear face with each other, so that productivity increases and the yield improves.

3. Third Embodiment

Figure 13A:
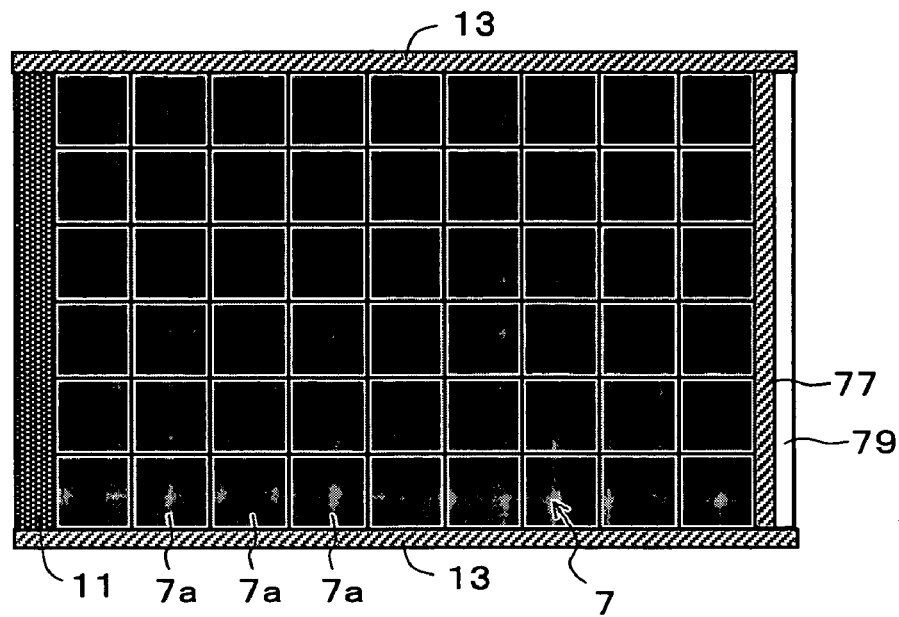
FIGS. 13A and 13B are a plan view and a cross-sectional view, respectively, of an optical recording medium according to a third embodiment of the present invention.
Figure 13B:
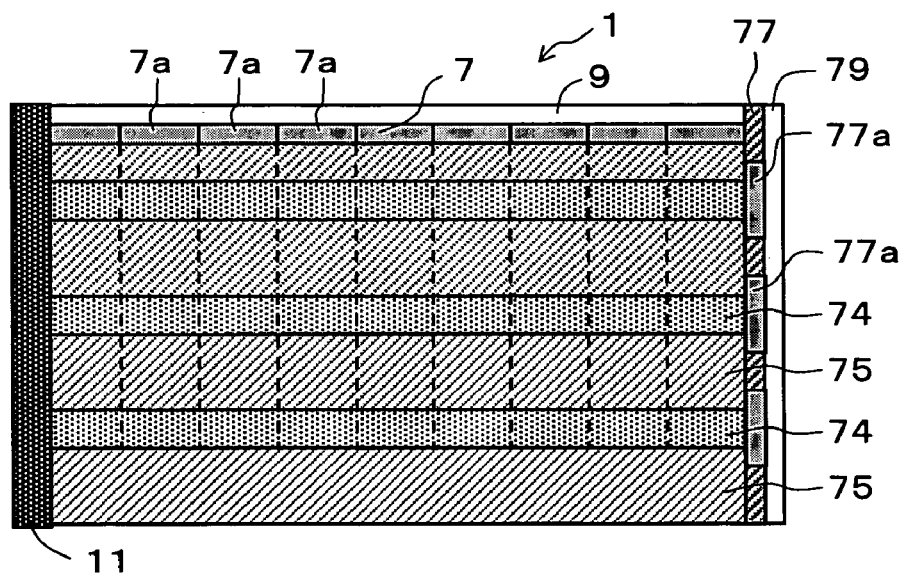

FIGS. 13A and 13B are a plan view and a cross-sectional view, respectively, showing a structure of an optical recording medium according to a third embodiment.

The medium 1 has a configuration in which data holographic recording layers 74 and data protection layers 75 are stacked alternately. The liquid crystal panel 7 is attached as the top face and a liquid crystal panel 77 is attached to one of side faces. The other configuration is similar to that of the first embodiment.

Figure 14:
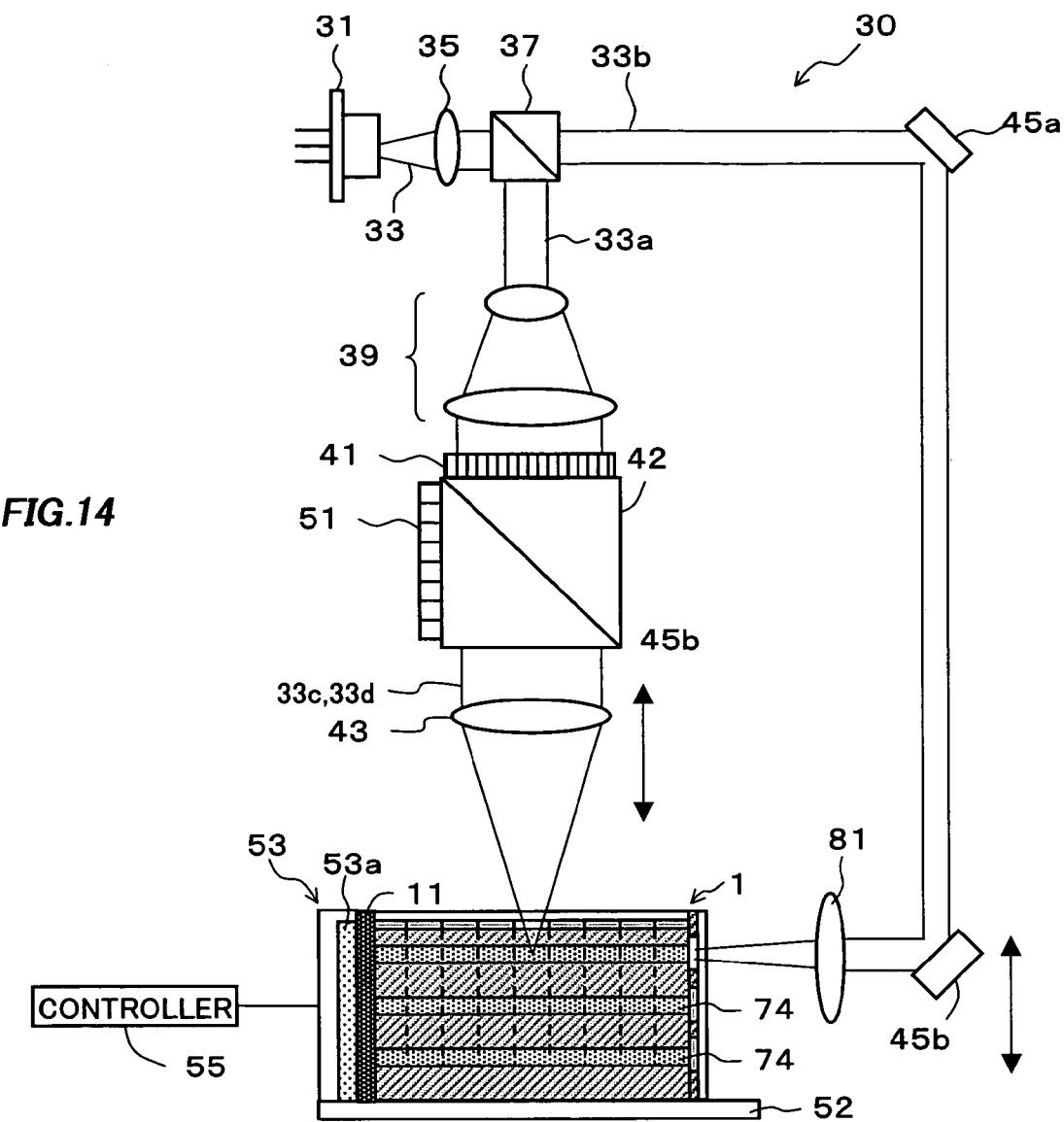
FIG. 14 is a configuration diagram showing a recording/reproducing device for the optical recording medium according to the third embodiment of the present invention.

A method for recording/reproducing the medium will now be described with reference to FIG. 14. FIG. 14 is a configuration diagram of the recording/reproducing device 30 according to this embodiment.

In this embodiment, mainly, the reference beam irradiating method is different from the first embodiment. The beam 33b is reflected by the mirrors 45a and 45b and, after that, is condensed by a lens 81. The recording layer 74 is irradiated with the condensed beam from the side face of the medium 1. In order to irradiate each of the plurality of recording layers 74 with the reference beam, a driver (lens actuator) (not shown) for moving the mirror 45b vertically is provided. Since it is necessary to obtain focus of the object beam 33c on each of the plurality of recording layers 74 of the medium 1, a driver of moving the objective lens 43 vertically is provided.

By using this medium, at the time of recording, only the pixel 7a in the plane position designated is made light-transmittable. The top face is irradiated with the object beam 33c. Only a pixel 77a in a layer to which information is to be written from the side face is made light-transmittable and is irradiated with the reference beam 33b. At the time of reproduction, only the pixel 77a in the layer from which information is to be reproduced from the side face is made light-transmittable, and is irradiated with the reference beam 33b. The pixel 7a in the plane position in the top face from which information is to be reproduced is made light-transmittable and, information is read from the pixel 7a. A recording/reproducing address control is managed by plane address information and layer address information to which the reference beam is to be applied.

In this embodiment, information can be recorded in multiple recording layers, so that recording density per unit area can be increased.

In another embodiment, a phase modulator may be provided in an optical path of the reference beam 33b and phase-code multiplexing recording may be performed. In this case, both of multilayer recording and multiplex recording can be performed, so that extremely high recording density can be achieved.

4. Fourth Embodiment

Figure 15A:
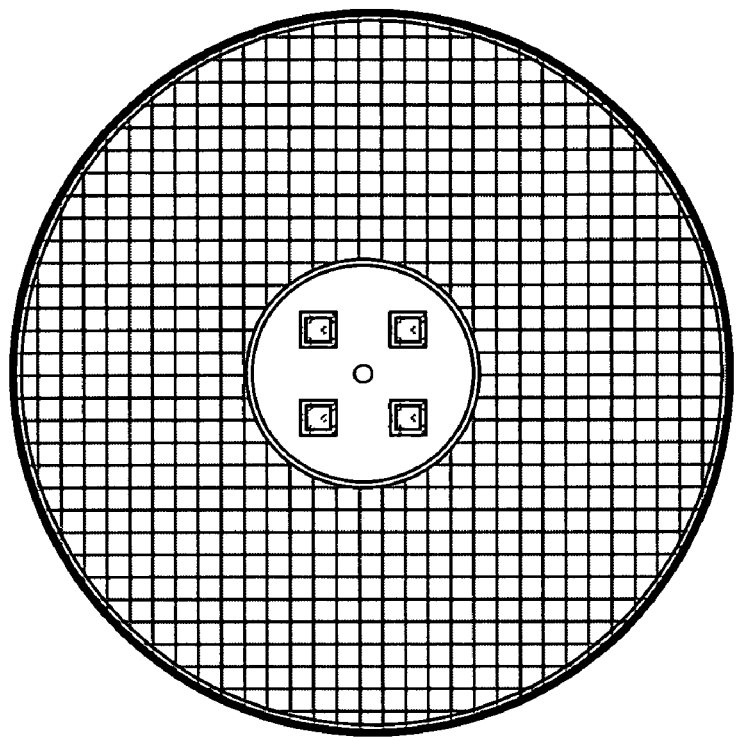
FIGS. 15A and 15B are a plan view and a cross-sectional view, respectively, of an optical recording medium according to a fourth embodiment of the present invention.
Figure 15B:
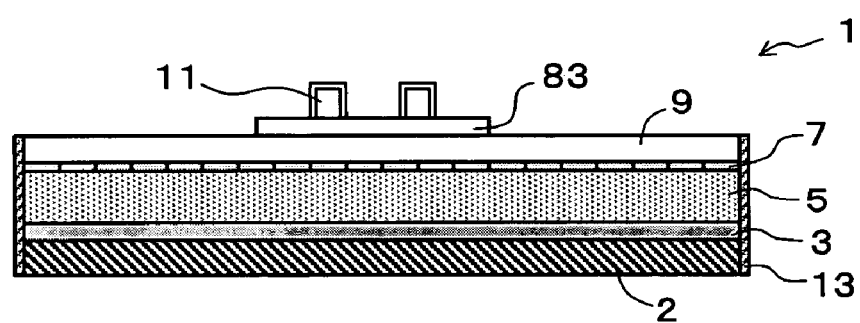

FIGS. 15A and 15B are a plan view and a cross-sectional view, respectively, showing a structure of an optical recording medium according to a fourth embodiment. The medium 1 has a disc shape and includes the projected control electrode 11 in a chucking part 83 in the center, and the whole periphery of the disc is covered with the light shield film 13. The other configuration is similar to that of the first embodiment.

Figure 16A:
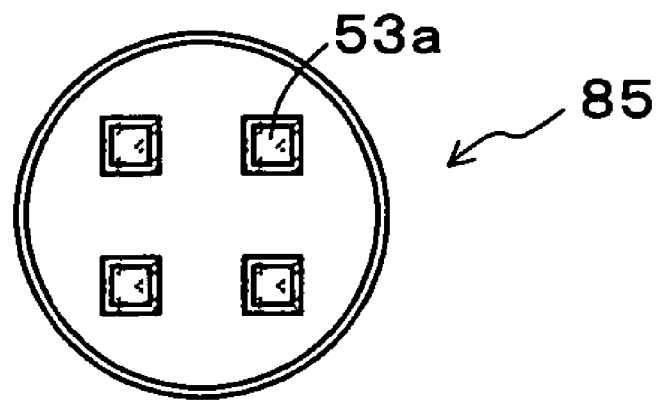
FIGS. 16A and 16B are a plan view and a cross-sectional view, respectively, of a spindle for the optical recording medium according to the fourth embodiment of the present invention.
Figure 16B:
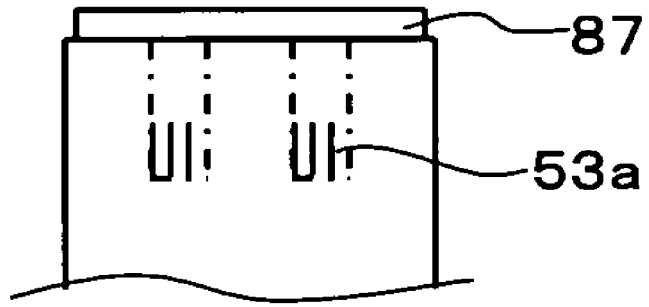

FIGS. 16A and 16B are a plan view and a cross-sectional view, respectively, showing a structure of a spindle 85 for attaching the medium 1. The chucking part 83 of the spindle 85 has the recessed connection electrode 53a in which the projected control electrode 11 of the medium 1 is to be fit. The spindle 85 is assembled in the recording/reproducing device 30 (refer to FIG. 1) similar to that of the first embodiment. The recessed connection electrode 53a is electrically connected to the controller 55 of the recording/reproducing device 30.

At the time of recording/reproducing information to/from the medium 1 of this embodiment, first, the medium 1 is attached to the spindle 85 so that the projected control electrode 11 of the medium 1 is electrically connected to the recessed connection electrode 53a of the spindle 85. The liquid crystal panel 7 of the medium 1 is controlled pixel by pixel by the controller 55 via the electrodes 11 and 53a. The controller 55 makes only a pixel to be recorded/reproduced light-transmittable, and information is recorded/reproduced in a manner similar to the first embodiment.

Although the structure of the reflection type is shown in FIGS. 15A and 15B, a structure of a transmission type like the second embodiment may be also employed. A light shield member may be provided on both faces of the medium in a manner similar to the embodiment shown in FIGS. 11A to 11C and FIGS. 12A to 12C. The shape of each of the control electrode 11 and the connection electrode 53a can be variously modified. For example, the control electrode 11 may have a recessed shape, and the connection electrode 53a may have a projected shape.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium comprising:
a substrate;
a reflection layer formed on the substrate;
a holographic recording layer, formed on the reflection layer, on which information is recorded by means of holography;
a light shield member fixed on at least one main surface of the holographic recording layer; and
a control electrode for controlling a light transmission state of the light shield member, wherein
the light shield member has a plurality of pixels obtained by dividing the light shield member on a recording unit region basis, and the light transmission state can be controlled pixel by pixel.

2. The medium according to claim 1, wherein
when no current is applied to the control electrode, the light shield member is in light non-transmittable state.

3. The medium according to claim 1, wherein
each of the pixels has a substantially regular hexagonal shape, and the pixels are arranged so as to be closely packed.

4. The medium according to claim 1, wherein
the light shield member is a liquid crystal panel or an MEMS panel.

5. The medium according to claim 1, wherein
the light shield member is an MEMS panel, and the light transmission state is controlled by opening/closing an aperture.

6. The medium according to claim 1, wherein
the control electrode is provided on a side face of the holographic recording layer.

7. The medium according to claim 1, wherein
a light shield film is provided on a side face of the holographic recording layer.

8. The medium according to claim 1, wherein
a shutter is provided on the other main surface of the holographic recording layer.

9. The medium according to claim 8, wherein
a light shield film is provided on a side face of the holographic recording layer.

10. The medium according to claim 1, wherein
another light shield member is fixed to the other main surface of the holographic recording layer.

11. The medium according to claim 10, wherein
a light shield film is provided on a side face of the holographic recording layer.

12. A method for recording information on an optical recording medium which comprises a substrate, a reflection layer formed on the substrate, a holagphic recording layer, formed on the reflection layer, on which information is recorded by means of holography, a light shield member fixed on at least one main surface of the holographic recording layer, and a control electrode for controlling a light transmission state of the light shield member, in which the light shield member has a plurality of pixels obtained by dividing the light shield member on a recording unit region basis, and the light transmission state can be controlled pixel by pixel, the method comprising the steps of:
applying a predetermined voltage to the control electrode to make at least one of the pixels of the light shield member light-transmittable;
irradiating the holographic recording layer with an object beam via the light-transmittable pixel in this state; and
simultaneously irradiating the position irradiated with the object beam with a reference beam to record information on a region corresponding to the pixel.

13. A method for reproducing information from an optical recording medium which comprises a substrate, a reflection layer formed on the substrate, a holographic recording layer, formed on the reflection layer, on which information is recorded by means of holography, a light shield member fixed on at least one main surface of the holographic recording layer, and a control electrode for controlling a light transmission state of the light shield member, in which the light shield member has a plurality of pixels obtained by dividing the light shield member on a recording unit region basis, and the light transmission state can be controlled pixel by pixel, the method comprising the steps of:
applying a predetermined voltage to the control electrode to make at least one of the pixels of the light shield member light-transmittable;
irradiating the holographic recording layer with a reference beam in this state; and
detecting the reference beam via the light-transmittable pixel to reproduce information recorded on the region corresponding to the pixel.

14. A device for comprising:
a recording/reproducing information unit that records/reproduces information to/from an optical recording medium which has a substrate, a reflection layer formed on the substrate, a holographic recording layer on which information is recorded by means of holography formed on the reflection layer, a light shield member fixed on at least one main surface of the holographic recording layer and a control electrode for controlling a light transmission state of the light shield member wherein the light shield member has a plurality of pixels obtained by dividing the light shield member on a recording unit region basis, and the light transmission state can be controlled pixel by pixel;
a mounting part on which the optical recording medium is mounted;
a connection part to be electrically connected to the control electrode;
a controller for electrically controlling the light shield member via the connection part; and
a light emitter for emitting an object beam and a reference beam to the holographic recording layer.

15. The device according to claim 14, wherein
when recording information A on the holographic recording layer, the controller sets a portion in a light shield member corresponding to a position of a pixel in which the information A is to be recorded into a light transmittable state.

* * * * *